United States Patent

Nguyen Phuoc

[19]

[11] Patent Number: 5,955,862
[45] Date of Patent: Sep. 21, 1999

[54] FREQUENCY CONVERTER FOR AC MOTOR

[75] Inventor: Vinh Tung Nguyen Phuoc, Boulogne-Billancourt, France

[73] Assignee: Schneider Electric SA, Boulogne Billancourt, France

[21] Appl. No.: 08/835,025

[22] Filed: Mar. 27, 1997

[30] Foreign Application Priority Data

Mar. 28, 1996 [FR] France .................................. 96 04038

[51] Int. Cl.$^6$ ....................................................... H02P 5/28
[52] U.S. Cl. ........................... 318/801; 318/803; 318/811
[58] Field of Search ..................................... 318/770–832

[56] References Cited

U.S. PATENT DOCUMENTS

| | | | |
|---|---|---|---|
| 3,796,935 | 3/1974 | Blaschke .................................. | 318/227 |
| 4,335,343 | 6/1982 | Dreiseitl et al. ......................... | 318/798 |
| 4,338,559 | 7/1982 | Blaschke et al. ........................ | 318/805 |
| 4,388,577 | 6/1983 | Blaschke et al. ........................ | 318/717 |
| 4,409,533 | 10/1983 | Hickman ................................. | 318/811 |
| 4,423,367 | 12/1983 | Blaschke et al. ........................ | 318/803 |
| 4,484,128 | 11/1984 | Jotten et al. ............................. | 318/805 |
| 4,520,298 | 5/1985 | Abbondanti . | |
| 4,763,058 | 8/1988 | Heining et al. .......................... | 318/807 |
| 4,904,920 | 2/1990 | Rufer ....................................... | 318/800 |
| 4,968,925 | 11/1990 | De Doncker ............................ | 318/727 |
| 4,994,950 | 2/1991 | Gritter ...................................... | 363/41 |
| 5,194,797 | 3/1993 | Kahkipuro ............................... | 318/727 |
| 5,272,429 | 12/1993 | Lipo et al. ............................... | 318/808 |
| 5,317,246 | 5/1994 | Wei .......................................... | 318/432 |
| 5,576,606 | 11/1996 | Nguyen Phuoc et al. . | |
| 5,635,811 | 6/1997 | Rebhan et al. .......................... | 318/778 |
| 5,644,205 | 7/1997 | Nguyen Phuoc et al. . | |

OTHER PUBLICATIONS

Xue, et al., "A Stator Flux–Oriented Voltage Source Variable–Speed Drive Based on dc Link Measurement", IEEE Transactions on Industry Applications, vol. 27, No. 5,(1991), pp. 962–969.

Moynihan, et al., "Single Sensor Current Control of AC Servodrives Using Digital Signal Processors", The European Power Electronics Association, vol. 3,(1993), pp.415–421.

Moynihan, et al., Indirect Phase Current Detection for Field Oriented Control of a Permanent Magnet Synchronous Motor Drive, EPE'91: 4$^{th}$ European Conference on Power Electronics, vol.3, (1991), pp. 641–646.

Primary Examiner—Paul Ip
Attorney, Agent, or Firm—Oblon, Spivak, McClelland, Maier & Neustadt, P.C.

[57] ABSTRACT

A frequency converter for an asynchronous motor including a voltage converter (O) equipped with switches (Sa, Sb, Sc) controlled by a control circuit (CC) and powered by a DC bus (B) on which a shunt (Sh) is installed to measure a DC current passing through the bus, wherein, when at least one of two components of an output voltage vector Vs is less than a predetermined value TMIN, the frequency converter includes a device which calculates firstly a vector Vs' each of two components thereof being at least equal to the predetermined value TMIN, and secondly a vector Vs" such that vectorial average of Vs' and Vs" is equal to the output vector Vs.

6 Claims, 7 Drawing Sheets

FREQUENCY CONVERTER FOR AC MOTOR

BACKGROUND OF THE INVENTION

1. Field of the Invention

The present invention concerns a frequency converter for an asynchronous motor comprising a voltage converter equipped with switches controlled by a control circuit and powered by a DC bus on which there is a shunt measuring the DC current passing through the bus.

2. Discussion of the Background

In order to control a multiphase AC motor such as an asynchronous motor, a frequency converter is used which controls the motor at variable frequency and voltage from the AC network. This type of frequency converter comprises a rectifier stage which after filtering, supplies a DC power supply to a voltage converter. The converter comprises switches Sa, Sb, Sc which are controlled by a control circuit in order to output a series of fixed amplitude pulses (positive or negative) modulated in width, to the motor. This technique is called pulse width modulation (PWM).

In a balanced three-phase system, a variable may be represented by a vector in which the components on three axes at 120° are values of this variable on each phase. The end of the output voltage vector Vs may be in one of eight positions; on the vertices of a hexagonal (vectors V1 to V6) and at the center of the hexagon (null vectors V0 and V7). There is a control combination of switches Sa, Sb, Sc for each position of the voltage vector.

The vectorial modulation technique consists of considering an arbitrary voltage vector Vs as being the combination of two adjacent vectors and the null vector within a time interval Tp.

Referring to FIG. 2, an output voltage vector Vs may be in any one of the six sectors formed in space by vectors V1 to V6. In the example shown in FIG. 2, Vs is located in sector 0 between adjacent vectors V1 and V2. Vector Vs may be controlled by its adjacent vectors, namely V1 and V2 in the case mentioned above. The application duration of each adjacent vector is determined by the projection of the vector Vs on the axis of this adjacent vector. These durations ti and tk are calculated as a function of the PWM period, the bus voltage and the angle θ made by Vs and the first adjacent vector.

Knowing the times ti and tk, the period Tp (the inverse of the switching frequency) is filled in symmetrically with the duration of null vectors V0 and V7. If a symmetric PWM is adopted, the switching diagram shown in FIG. 3 is obtained.

In an asynchronous motor, the statoral current generates the flux and the torque. The static current may be broken down into a magnetizing current Id which will generate the flux and an active current Iq which will generate the torque.

The phase currents Ia, Ib, and Ic can be restored by measuring the current Idc on the bus using a shunt and the statuses of switches Sa, Sb, and Sc shown in FIG. 1. The current Idc measured by the shunt is explained as a function of the phase currents Ia, Ib and Ic and as a function of the switching states of switches Sa, Sb, Sc (0 or 1) in the form Idc=Sa.Ia+Sb.Ib+Sc.Ic. Thus knowing the switching state of the bridge, it is theoretically possible to restore currents Ia, Ib, Ic in the phases starting from the current Idc in the bus. In order to do this, at least two states are necessary to identify two different currents per PWM period.

When the three reference voltages Va, Vb and Vc are close to zero, the duration of state such as V1 and V2 become small and it is impossible to correctly measure the bus current Idc. The duration of significant states must exceed a predetermined time TMIN that covers the interchannel delay time, the current rise and setup time in the shunt, the current acquisition time and the processing time.

U.S. Pat. No. 4,520,298 concerns restoration of phase currents starting from the measured current in the DC bus, but does not consider the problem of restoring phase currents at low speed.

The paper "A Stator Flux-Oriented Voltage Source Variable Speed Drive Based On dc Link Measurement" published in IEEE in 1991, suggested canceling and accumulating states with durations that were too short until a minimum duration was obtained. At low speed this solution could cause large voltage oscillations.

The paper "Indirect Phase Current Detection for Field Oriented Control of a Permanent Magnet Synchronous Motor Drive" published by EPE in 1991, suggested replacing the duration of a state by a duration TMIN, when the duration is too short. This may cause large errors on the voltage at low speed.

SUMMARY OF THE INVENTION

The purpose of this invention is to improve how currents are restored at a low speed and thus improve the performances of the frequency converter.

The frequency converter according to the invention is characterized in that, for the case in which at least one of the two components of the output voltage vector is less than a predetermined value, it comprises means of calculating firstly a vector Vs' one of the components of which is at least equal to the predetermined value TMIN, and secondly a vector Vs" such that the vectorial average of the Vs' and the Vs" is equal to the output vector Vs.

According to one characteristic, for the case in which one of the two components of vector Vs is less than TMIN, the converter comprises means of calculating the vector Vs' by adding a predetermined value TMIN to the said component.

According to another characteristic, for the case in which the two components of vector Vs are less than TMIN, the converter comprises means of calculating a vector Vs' by adding the predetermined value TMIN to the two components of this vector Vs.

According to another characteristic, the vector Vs' is applied during the first half of the PWM period, and the vector Vs" is applied during the second half of the same period.

According to another characteristic, the vectors Vs' and Vs" are applied on two successive symmetrical PWM periods.

According to another characteristic, for the case in which at least one of the two components of vector Vs is less than the predetermined value TMIN, the converter comprises means of calculating the vector Vs' by adding a duration that extends the duration until the value of the TMIN is obtained exactly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
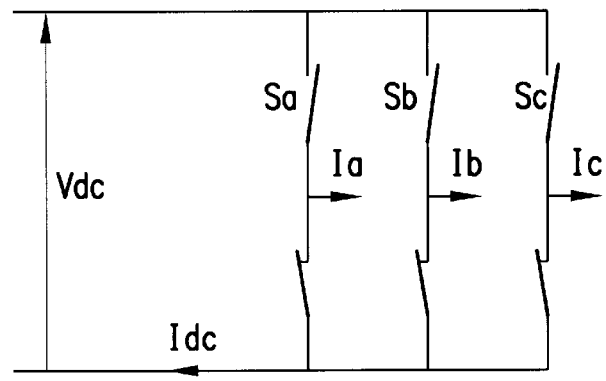
FIG. 1 is a known circuit for a converter, and on which currents in the phases and in the bus are shown.
Figure 2:
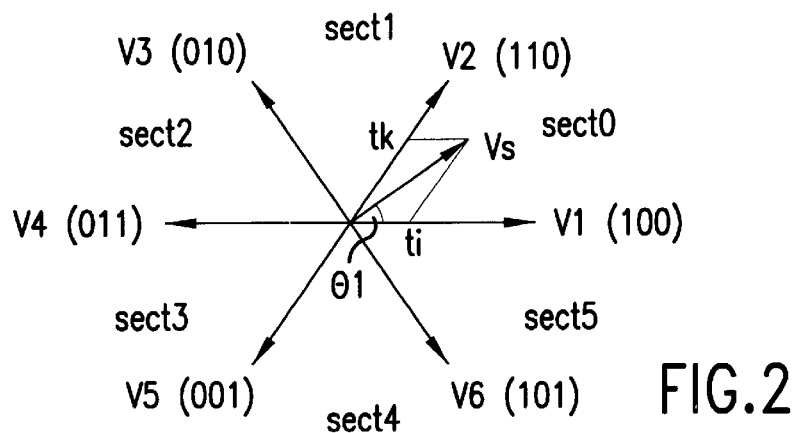
FIG. 2 is vectorial representation of a voltage vector Vs.
Figure 3:
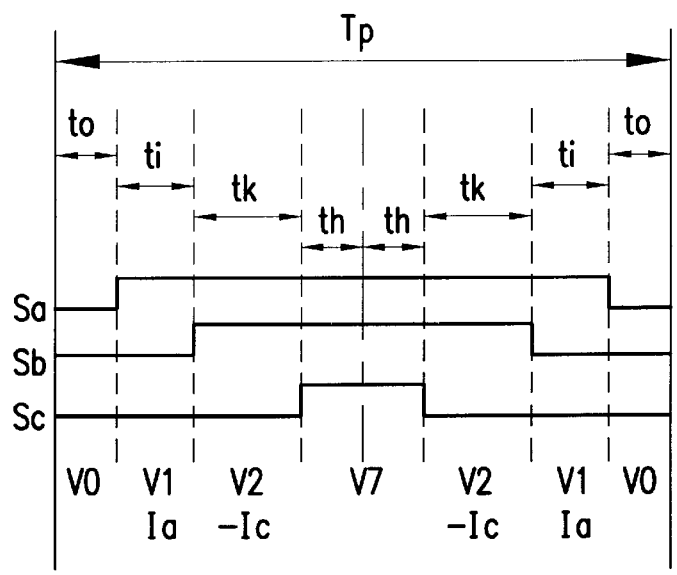
FIG. 3 is a diagram of the switching circuit for switches Sa, Sb and Sc for one period, as is the case in FIG. 2.
Figure 4:
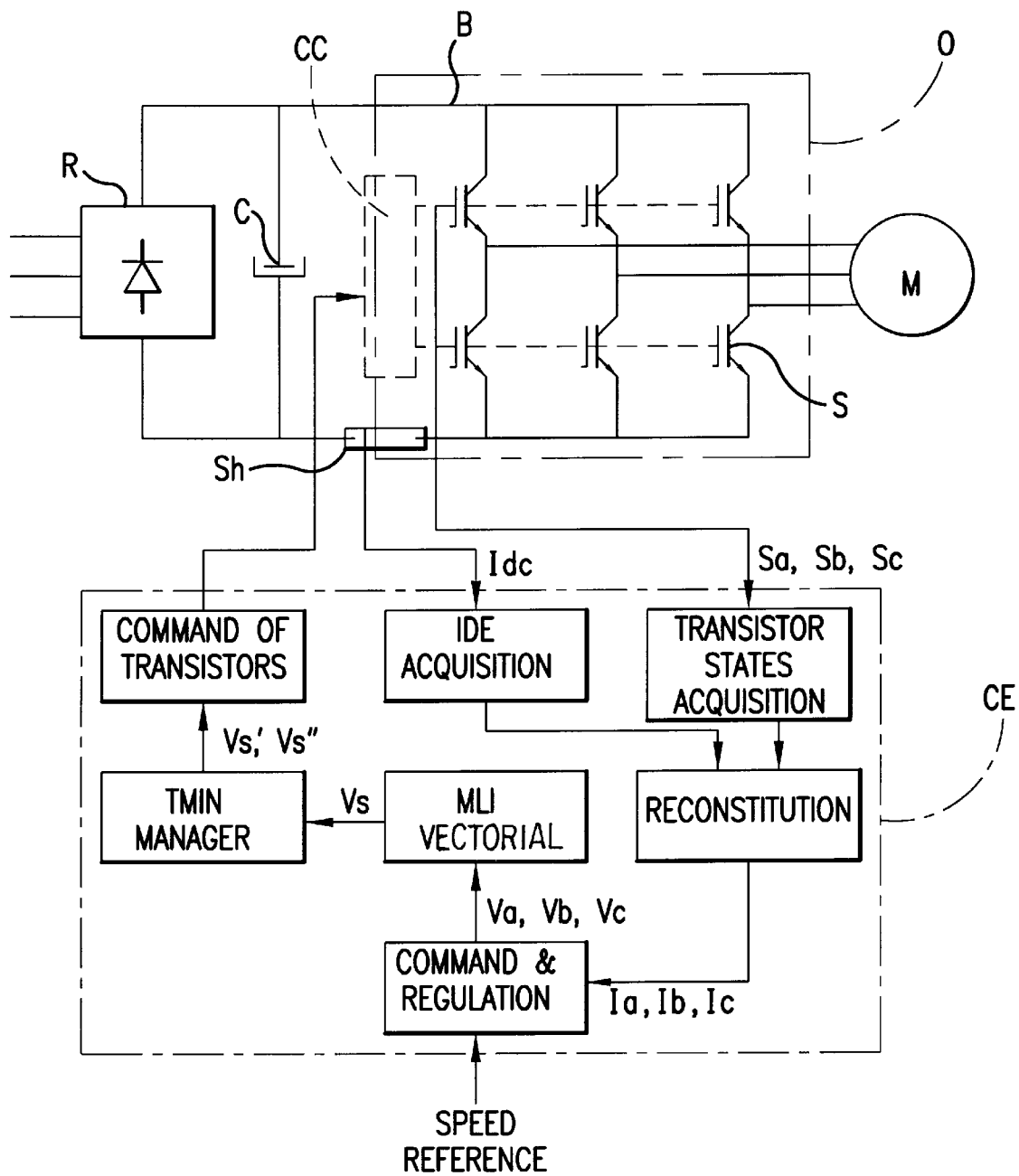
FIG. 4 is a diagram of a frequency converter according to the invention.

Referring now to the drawings, wherein like reference numerals designate identical or corresponding parts throughout the several views, and more particularly to FIG. 4 thereof, there is illustrated a frequency converter including;

The frequency converter shown in FIG. 4 a rectifier stage R which outputs DC energy through a DC bus B, after filtering by a capacitor C, to a voltage converter O. The voltage converter O comprises switches S that are controlled by a control circuit CC to output a series of fixed amplitude (positive or negative) pulses of modulated width, to the motor M. This technique is called pulse width modulation (PWM). The CC circuit receives three voltage references from a processing circuit CE and imposes voltages on the motor M according to the PWM technique. The voltage is generated, and currents are acquired and restored, in the CE processing circuit.

The current Idc in the bus B is measured by a shunt Sh. The states of transistors Sa, Sb and Sc are used in circuit CC, and are transferred to circuit CE. This processing circuit CE is shown diagrammatically in FIG. 4, and comprises means of reading the speed reference to acquire and decode transistor states Sa, Sb and Sc and the bus current Idc, to restore phase currents Ia, Ib and Ic to calculate switching orders for transistors Sa, Sb and Sc using the vectorial modulation method.

Circuit CE calculates transistor switching orders using a specific method defined in this invention, when at least one of the components of the output voltage vector Vs is less than a predetermined value TMIN.

Figure 5:
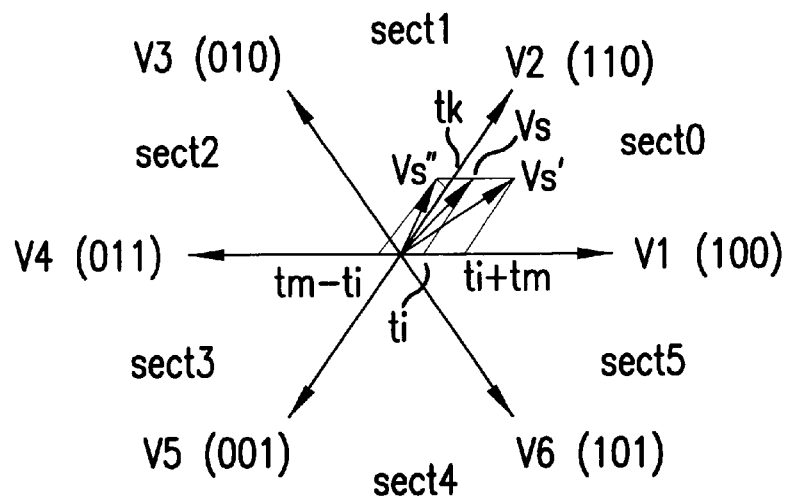
FIG. 5 is a vectorial representation of a voltage vector Vs applying the compensation according to the invention, one of the components of this vector being less than TMIN.
Figure 6:
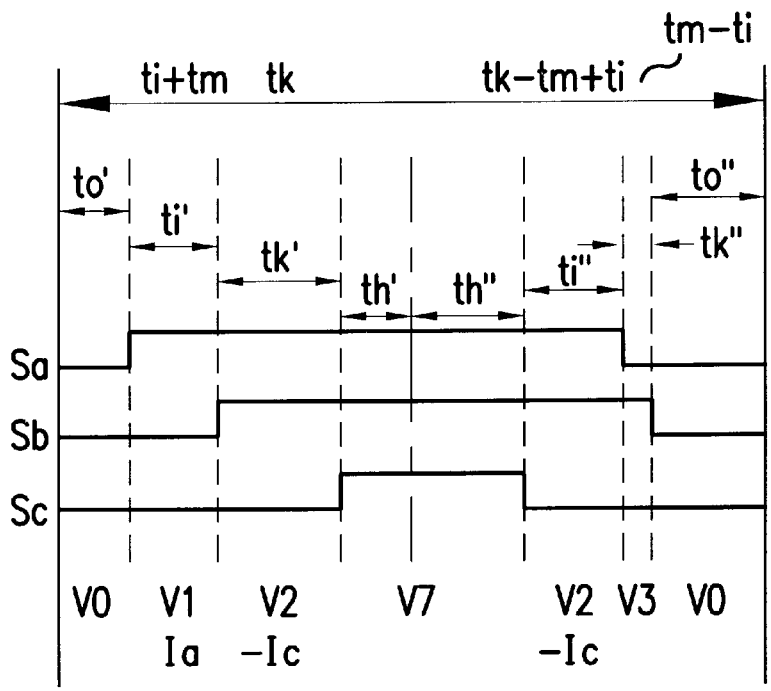
FIG. 6 is a switching diagram of switches Sa, Sb and Sc over one period, in this case shown in FIG. 5.

In the case shown in FIG. 5, one of the two components of the vector Vs is less than TMIN. A value TMIN is added to this component for a short duration in order to form a vector Vs'. This vector Vs' is associated with a vector Vs" such that the vectorial average of Vs' and Vs" is equal to Vs; The vectors Vs' and Vs" are located in two adjacent sectors.

Figure 7:
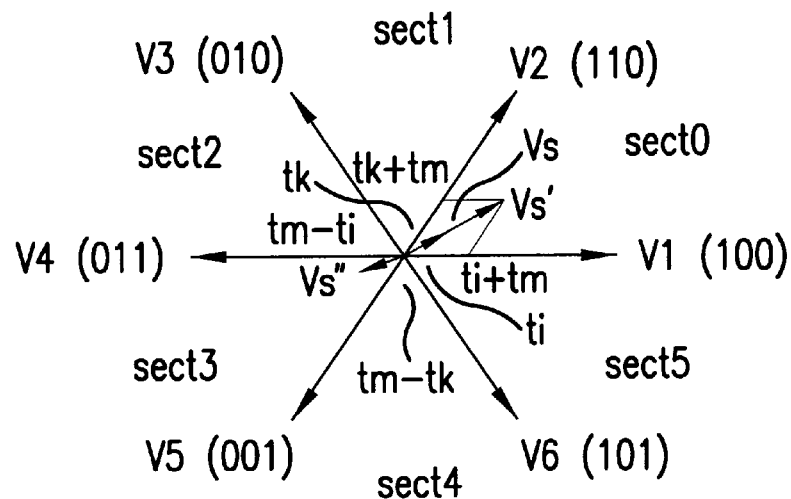
FIG. 7 is the vectorial representation of a voltage vector Vs applying the compensation according to the invention, the two components of this vector being less than TMIN.
Figure 8:
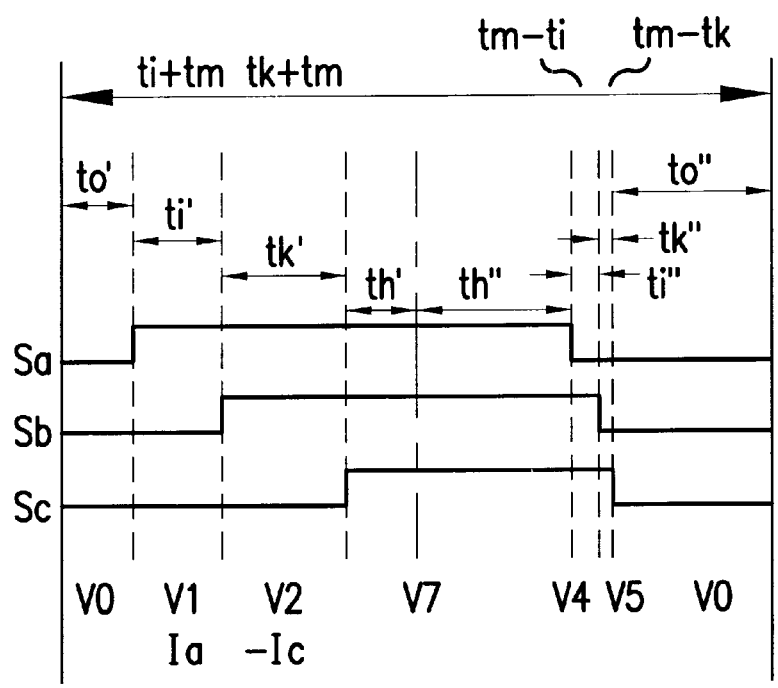
FIG. 8 is a switching diagram for switches Sa, Sb and Sc for one period, in the case shown in FIG. 7.

In the case shown in FIG. 7, the two components of vector Vs are less than TMIN. A value TMIN is added to the two components to form a vector Vs1. The vector Vs" is always determined to keep the average Vs. Vectors Vs' and Vs" are located in two opposite sectors.

Vs' is applied during the first half of the PWM period, and Vs" is applied during the second half of the same PWM period. Therefore the switching diagram over one PWM period is asymmetric. Current acquisitions may be made during application of Vs', both components of which are greater than or equal to TMIN.

As an alternative, the vectors Vs' and Vs" are applied on two symmetric PWM periods, instead of a single asymmetric period. This means that a conventional symmetric PWM can be used which is easier to create even if there is a slight increase in the voltage and the current oscillations.

As an alternative, instead of adding TMIN to the duration which is insufficient, the duration can be extended to obtain exactly TMIN. This consequently reduces voltage and current oscillations despite an increase in the calculation complexity.

Figure 9:
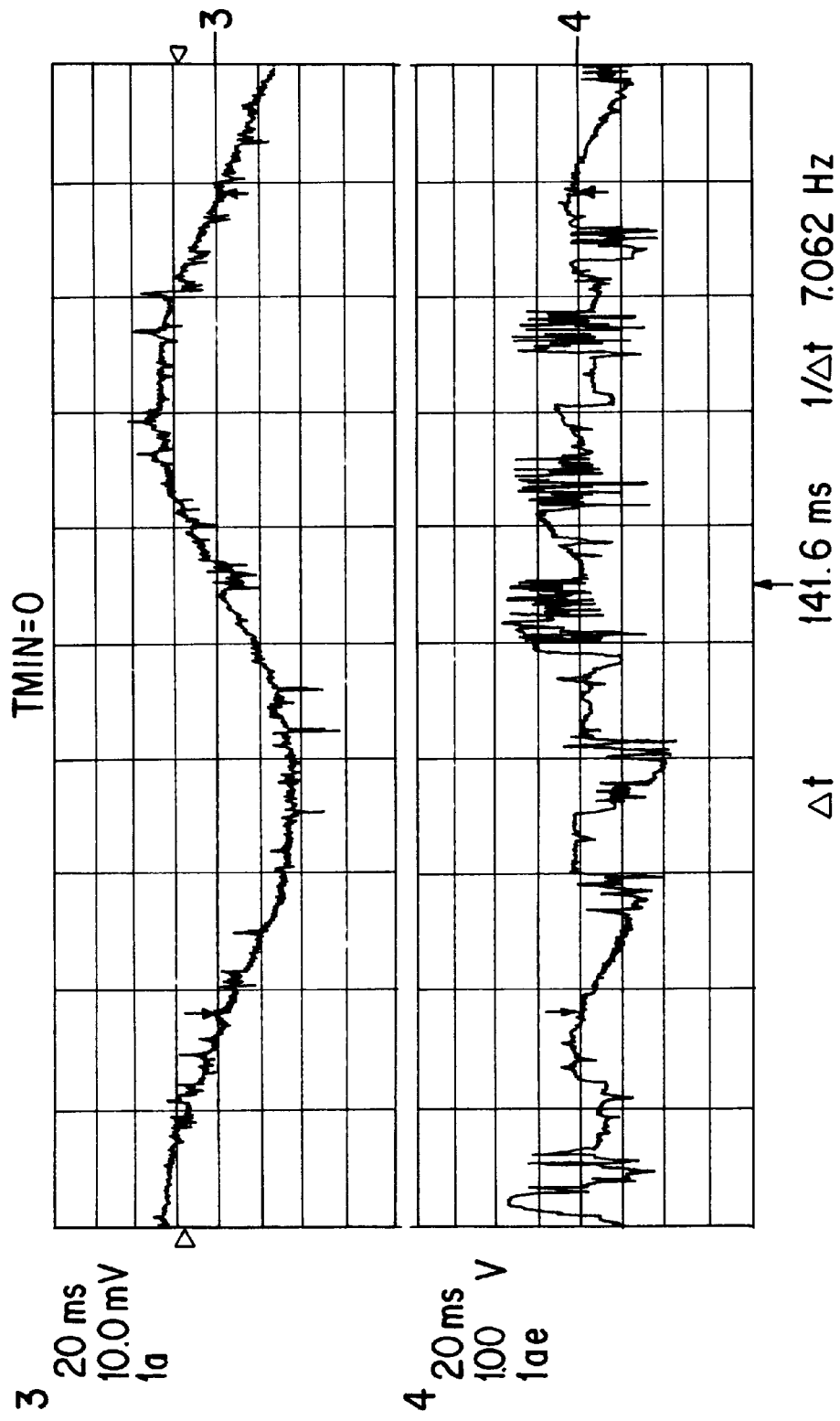
FIG. 9 shows the real phase current (at the top) and the restored phase current (at the bottom) at 7 Hz, if the invention is not applied.

FIG. 9 shows that restoration is already bad below 7 Hz if the invention is not used. If the invention is used, restoration remains good down to 1 Hz, as shown in FIG. 10.

Figure 10:
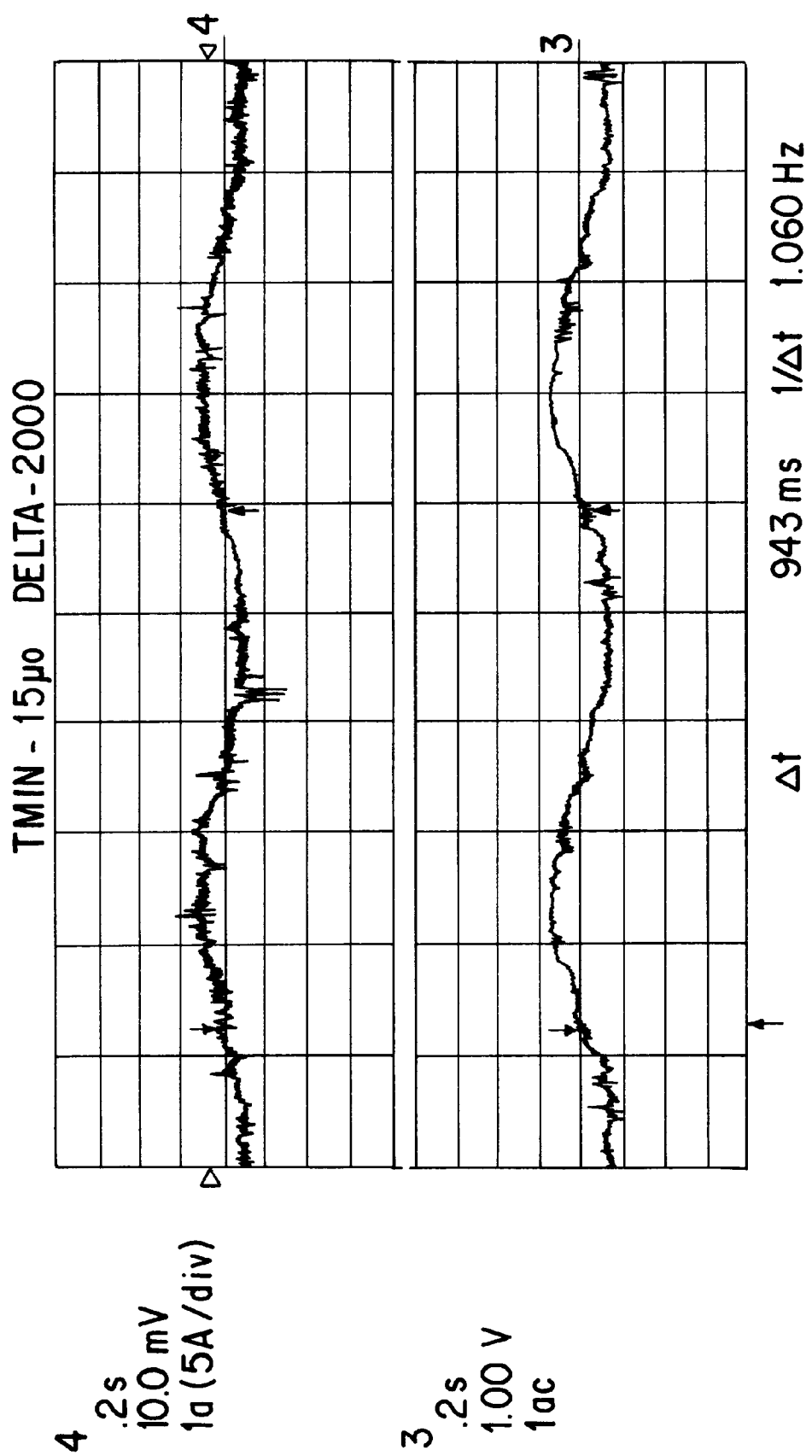
FIG. 10 shows the real phase current (at the top) and the restored phase current (at the bottom) at 1 Hz, if the invention is applied.
Figure 11:
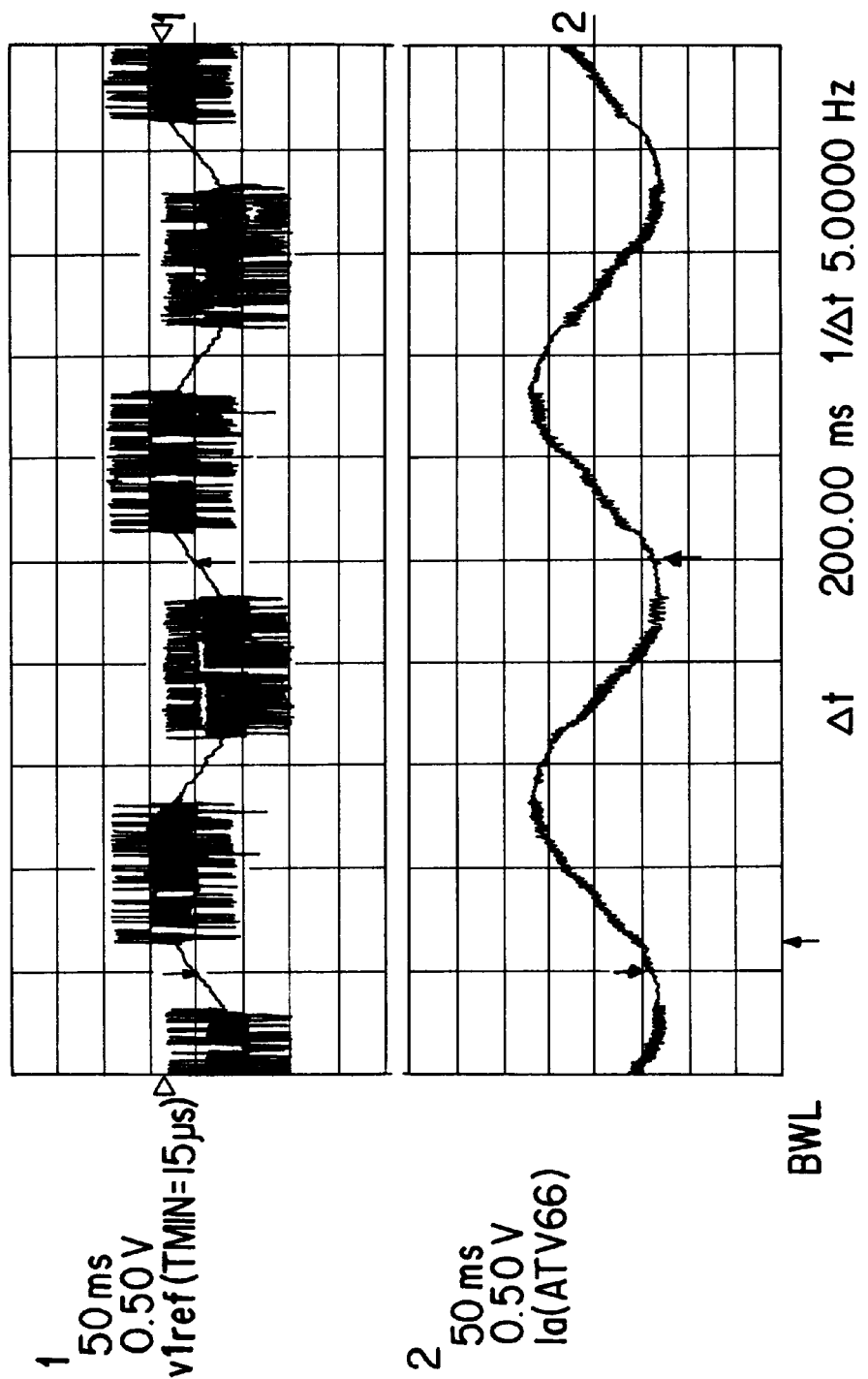
FIG. 11 shows the phase-neutral reference and the current in the phase measured synchronously with PWM, if the invention is applied.

The effect of breaking down the vector Vs into two vectors Vs' and Vs" on two successive symmetrical PWM periods can be seen on the voltage references and the phase current in FIG. 10. Oscillations on the current are reduced by half if compensation is done on a single PWM period instead of two.

Obviously, alternatives and detailed improvements could be imagined, or equivalent means could be used, without going outside the framework of the invention.

What is claimed as new and is desired to be secured by Letters Patent of the United States is:

1. A frequency converter for an asynchronous motor comprising:

a voltage converter including switches provided therein;

a DC bus including a shunt provided therein;

a control circuit; and a processing circuit;

wherein the switches of the voltage converter are controlled by the control circuit and are powered by the DC bus and the shunt measures DC current passing on the bus; and wherein the processing circuit calculates, when at least one of two components of an output voltage vector is less than a predetermined value, a first vector having each of two components thereof at least equal to the predetermined value, and calculates a second vector, wherein a vectorial average of the first and second vectors is equal to the output voltage vector.

2. The converter according to claim 1, wherein when one of the two components of the output voltage vector is less than the predetermined value the processing circuit calculates the first vector by adding the predetermined value to said one of the two components of the output voltage vector.

3. The converter according to claim 1, wherein when both components of the output voltage vector are less than the predetermined value, the processing circuit calculates the first vector by adding the predetermined value to the two components of the output voltage vector.

4. The converter according to claim 1, wherein the processing circuit applies the first vector during first half of a pulse width modulation period, and applies the second vector during a second half of the pulse width modulation period.

5. The converter according to claim 1, wherein the processing circuit applies the first and second vectors during two successive symmetrical pulse width modulation periods.

6. The converter according to claim 1, wherein when at least one of the two components of the output voltage vector is less than the predetermined value, the processing circuit calculates the first vector by adding a duration to the two components of the output voltage vector to extend the two components of the output voltage vector to equal the predetermined value.

* * * * *